Jan. 27, 1931.  T. U. WHITE  1,790,189
SUPERVISORY CONTROL SYSTEM
Filed June 7, 1926  11 Sheets-Sheet 1

Fig.1.

WITNESSES:
G. S. Neilson
Samuel Ostrolenk

INVENTOR
Thomas U. White
BY
Wesley S. Carr
ATTORNEY

Jan. 27, 1931. T. U. WHITE 1,790,189
SUPERVISORY CONTROL SYSTEM
Filed June 7, 1926 11 Sheets-Sheet 4

WITNESSES:
G. S. Neilson
Samuel Ostrolenk

INVENTOR
Thomas U. White
BY
Wesley G. Carr
ATTORNEY

Jan. 27, 1931.                    T. U. WHITE                    1,790,189
                            SUPERVISORY CONTROL SYSTEM
                              Filed June 7, 1926      11 Sheets-Sheet 6

Fig. 6.

WITNESSES:                                              INVENTOR
                                                    Thomas U. White
                                                          BY
                                                              ATTORNEY Jan. 27, 1931.    T. U. WHITE    1,790,189
SUPERVISORY CONTROL SYSTEM
Filed June 7, 1926    11 Sheets-Sheet 9

Fig. 9.

WITNESSES:

INVENTOR
Thomas U. White
BY
ATTORNEY

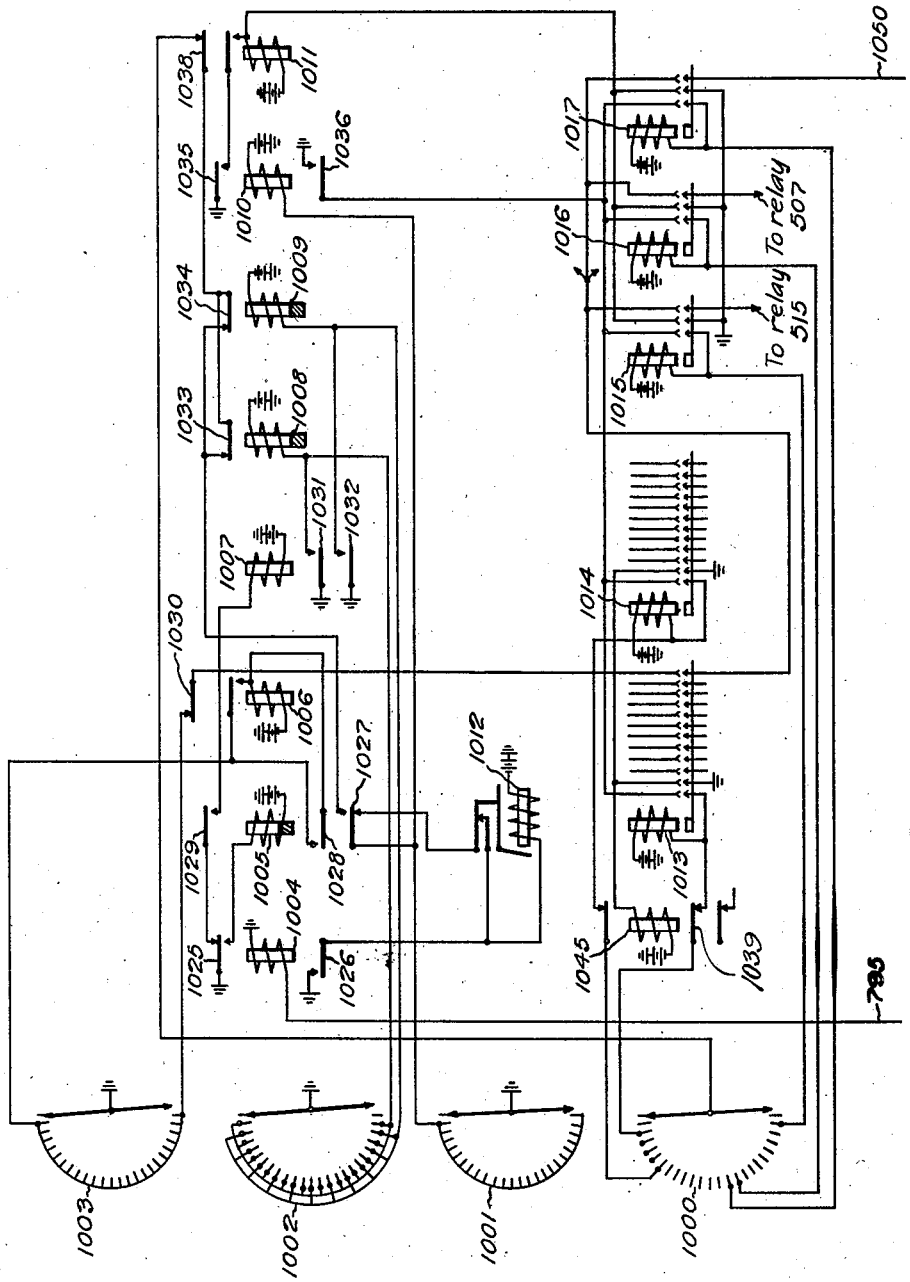

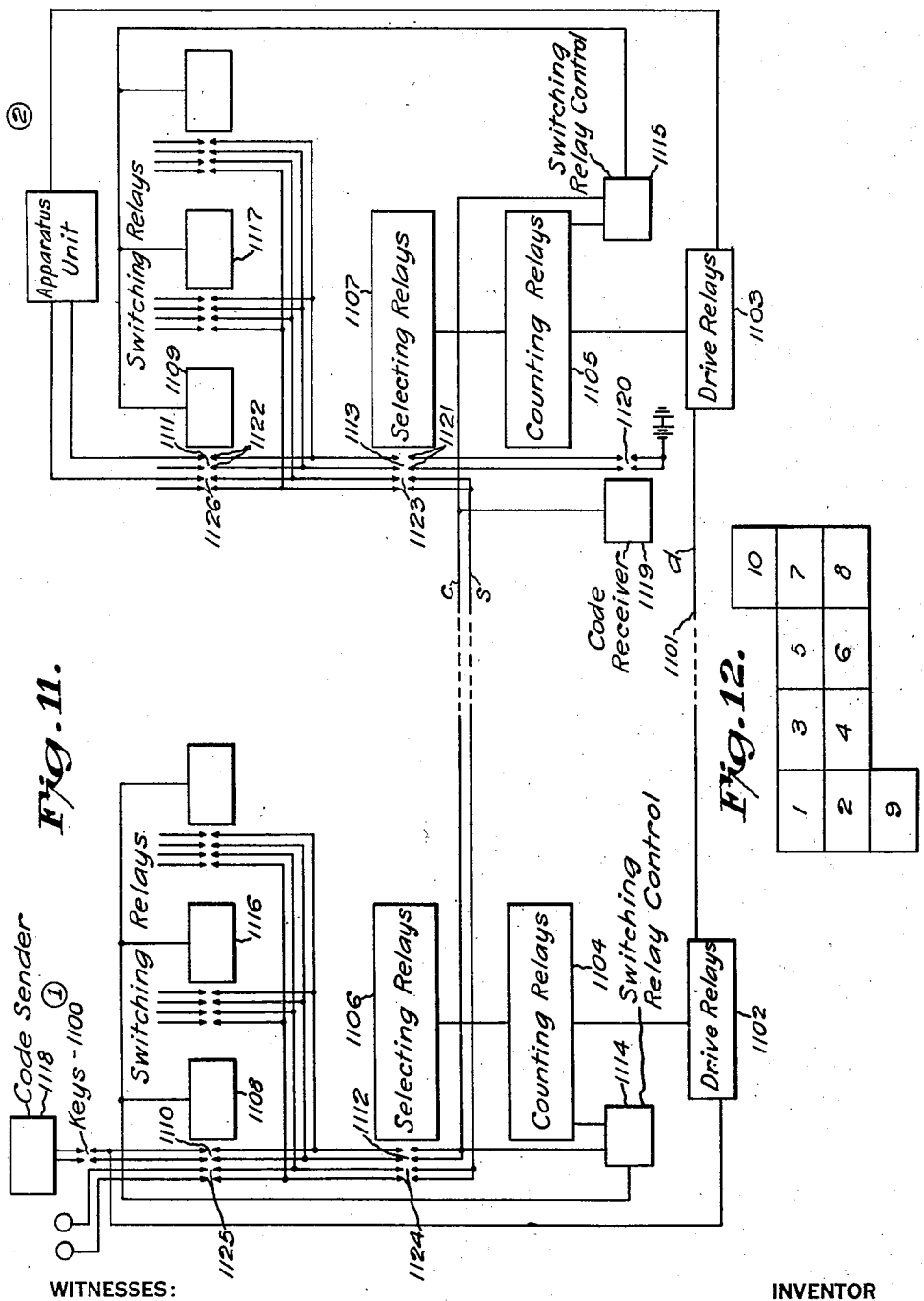

Patented Jan. 27, 1931

1,790,189

UNITED STATES PATENT OFFICE

THOMAS U. WHITE, OF PITTSBURGH, PENNSYLVANIA, ASSIGNOR TO WESTINGHOUSE ELECTRIC & MANUFACTURING COMPANY, A CORPORATION OF PENNSYLVANIA

SUPERVISORY CONTROL SYSTEM

Application filed June 7, 1926. Serial No. 114,087.

My invention relates to signalling systems and more particularly to supervisory-control systems.

An object of my invention is to provide means in a synchronous relay supervisory-control system for using the same group of counting relays and selecting relays repeatedly, in effecting a large number of selections.

Another object of my invention is to provide means for making selections greater in number than the counting or selecting relays used.

Another object of my invention is to provide means for switching the same bank of selecting relays from group to group of apparatus units.

Another object of my invention is to provide a synchronous drive circuit which permits the dispatcher to have control of the entire operation of the driving action.

Another object of my invention is to provide means for positive starting and re-starting of the operations.

Another object of my invention is to provide means for insuring that the apparatus unit selected for operation is completely operated before its operating circuit is cut off.

Another object of my invention is to provide means for identifying the selected unit.

A further object of my invention is to provide means for transmitting a code to identify the selection.

There are other objects of this invention, which, together with the foregoing, will appear in the specification which follows.

In synchronous relay systems heretofore used, a selecting relay such as that of the British Patent 257,606, has been provided individual to each of the apparatus units in the system. When a system, however, becomes very large as, for example, fifty or sixty apparatus units, it is obvious that the number of selecting relays required, produces a rather bulky and expensive system. It is found necessary, therefore, to provide some means for making as much of this apparatus as possible common to the apparatus units in order to reduce its bulk.

Although a very careful arrangement is provided in a synchronous relay system for maintaining synchronism, it is possible that an electrical surge from an adjoining line, may come upon a system just as the selected unit is reached, throwing the apparatus out of synchronism and causing a false selection. Such an effect, however, would have no serious consequences during the normal operation, since it would merely bring the apparatus to a stop. On the other hand, if the relays were thrown out of synchronism as they came to a stop on the operated key, the result might be serious. For this reason, provision for checking the actual selection made, before operating the apparatus unit, is desirable. These problems, found in the practical operation of the synchronous relay system, have been solved in the present invention.

In practicing my invention, I provide a group of counting relays, selecting relays and groups of apparatus units at two stations, with switching mechanism at each station for switching the counting and selecting relays from group to group of apparatus units. A code transmitter is provided at the office for transmitting a code to a receiver at the station for selecting one of the apparatus units, which, if identical with the apparatus unit selected in the operation of the relay chain, prepares an operating circuit for the selected apparatus unit.

Referring to the drawings,

Figs. 1, 2, 3, 4, and 9 are diagrams of the circuit connections and apparatus in the dispatcher's office, Figs. 5, 6, 7, 8 and 10 are diagrams of the circuit connections and apparatus units in the substation.

Fig. 11 is a diagrammatic view of the entire system, and

Fig. 12 is a diagram of the arrangement of the sheets of drawings.

Figure 2:
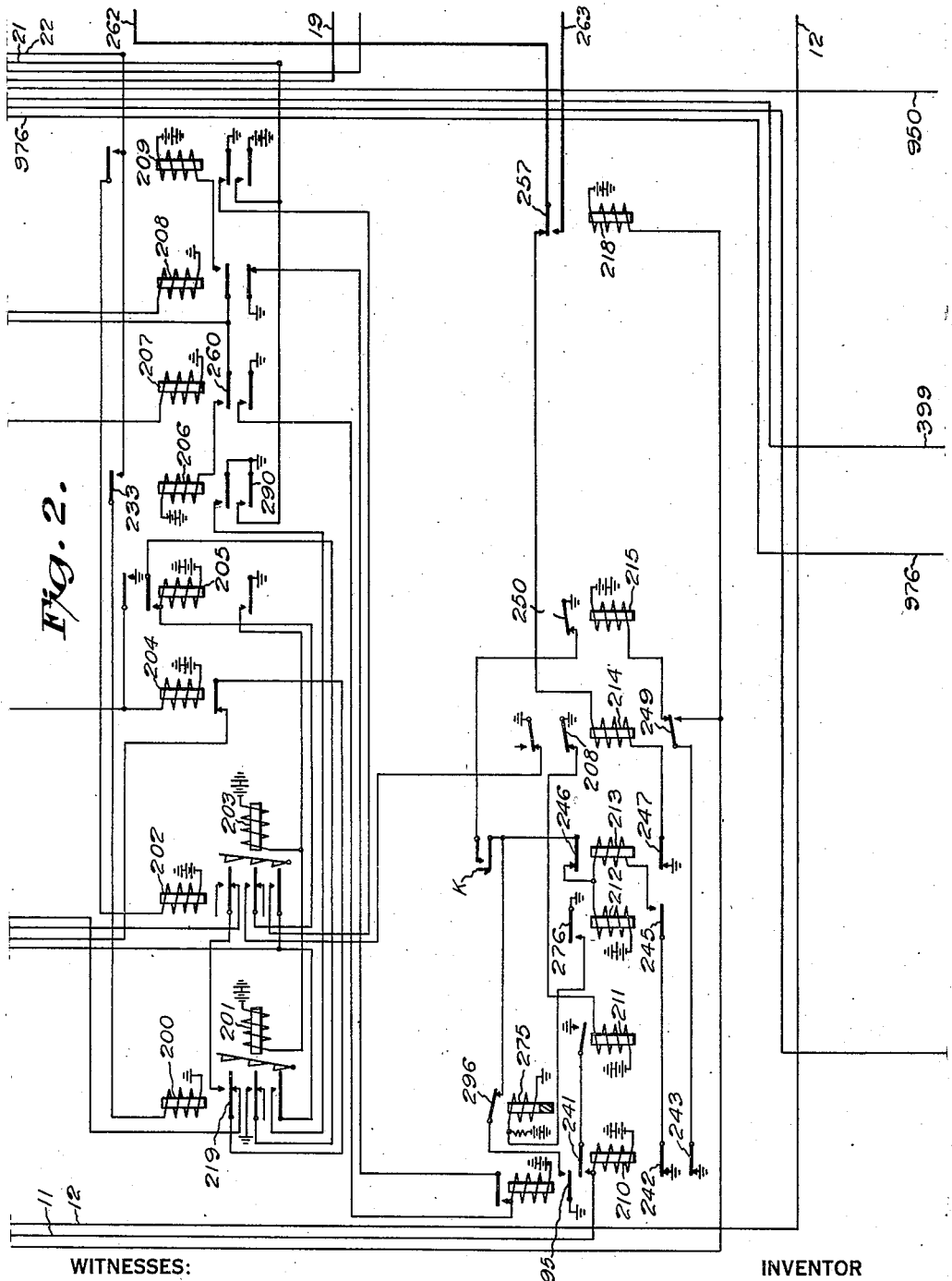

My invention comprises in general, a dispatcher's office 1 and a substation 2 connected by two signalling lines $c$ and $s$, and a drive line $d$ as shown in Fig. 11. At each station 1 and 2 I provide a synchronously operated relay chain 100 to 123 and 700 to 723, selecting relays 305 to 314 and 506 to 515 and apparatus units as 320 and C with switching mechanism 315 and 316, and 517 and 518 respectively, for switching the relay chain and selecting relays from group to group of apparatus units.

Referring briefly to the drawings, in Fig. 1 register relays 100 to 123 count the impulses transmitted between the stations. Relays 124 and 125 open locking circuits after all the counting relays are operated.

Referring to Fig. 2, relays 200 to 203 are latching relays for controlling the switching relays after the last of register and selecting relays have opened. Relay 204 controls the circuit to the switching relay 316 and is in turn energized in series with either relay 207 or 208 which control the energizing circuits of relays 206 and 209 respectively. These in turn, control relays 200 and 202. Relay 214 is a line relay, relays 212 and 213 operate to open this line under control of the key k, and relay 218 operates to switch the drive line from its normal to its operating position. Relays 215, 210 and 211 control the restarting operations.

Figure 3:
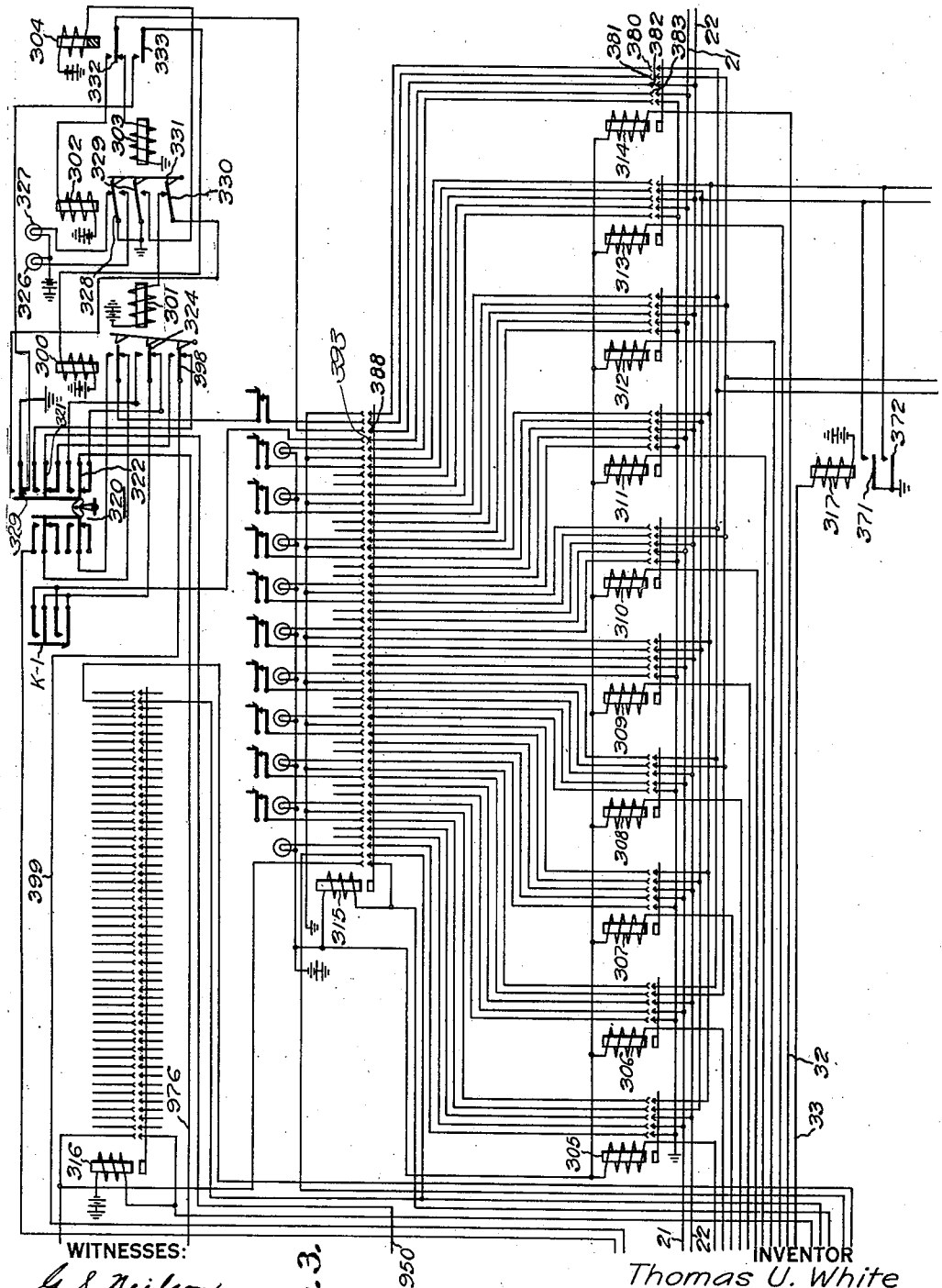

Referring to Fig. 3, relays 305 to 314 are the selectors and relays 315 and 316 function to switch the selector relays from group to group of units. The relays 300 to 304 are the latching relays for the supervisory and antipumping features, the unit 320 is an individual key for stopping the selectors at the apparatus unit desired to operate K—1 is an operating key.

Figure 4:
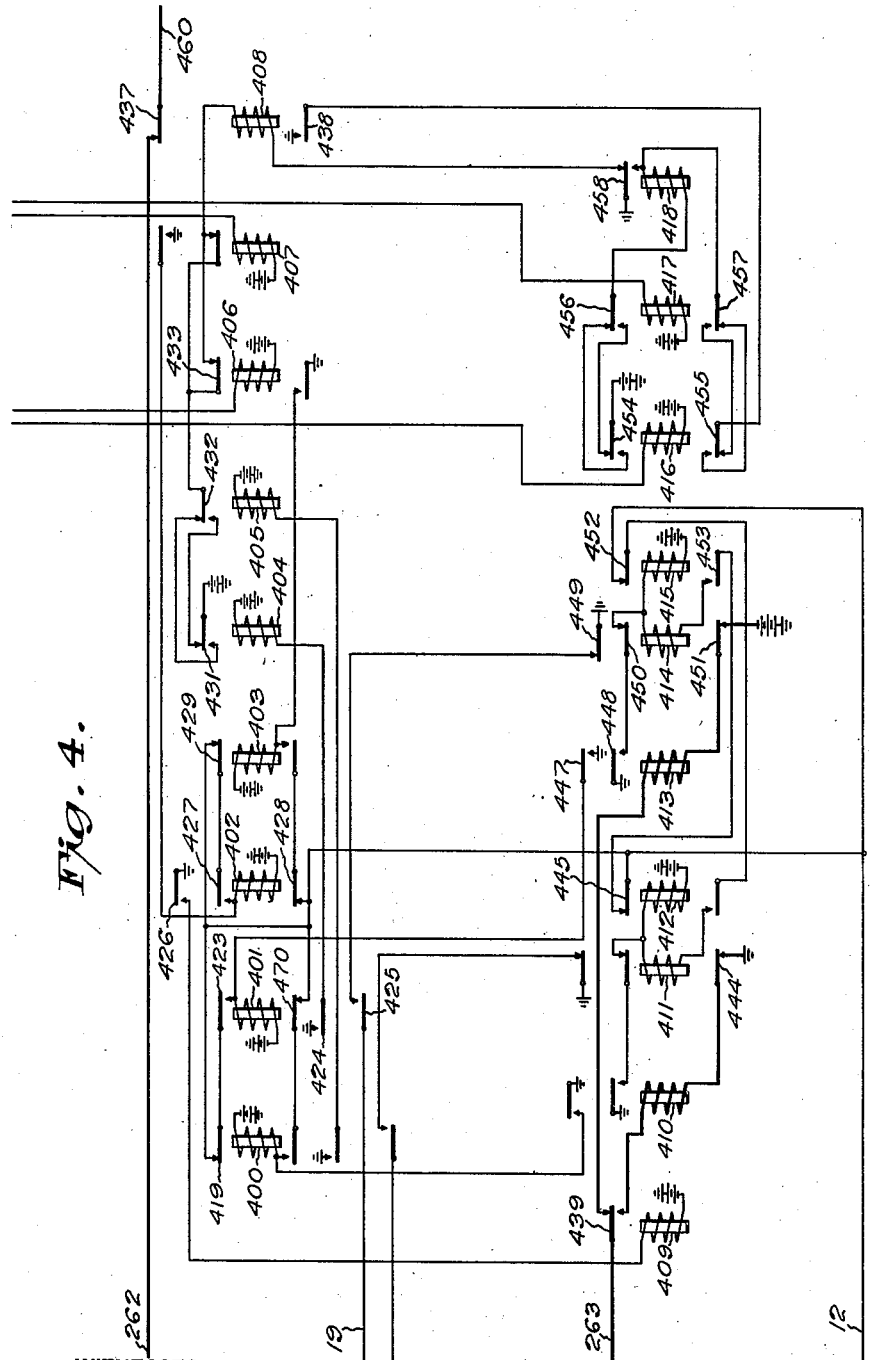

Referring to Fig. 4, relay 409 operates to switch the drive circuit to its alternative connections, relays 410 to 412 and 413 to 415 are the two groups of drive relays and 416 to 418 are switching relays. Relay 408 opens the drive circuit between signals, under control or relays 404 to 407 and 416 to 418. Relays 400 to 403 control the relaying of the drive circuit impulse to the relay chain.

Figure 5:
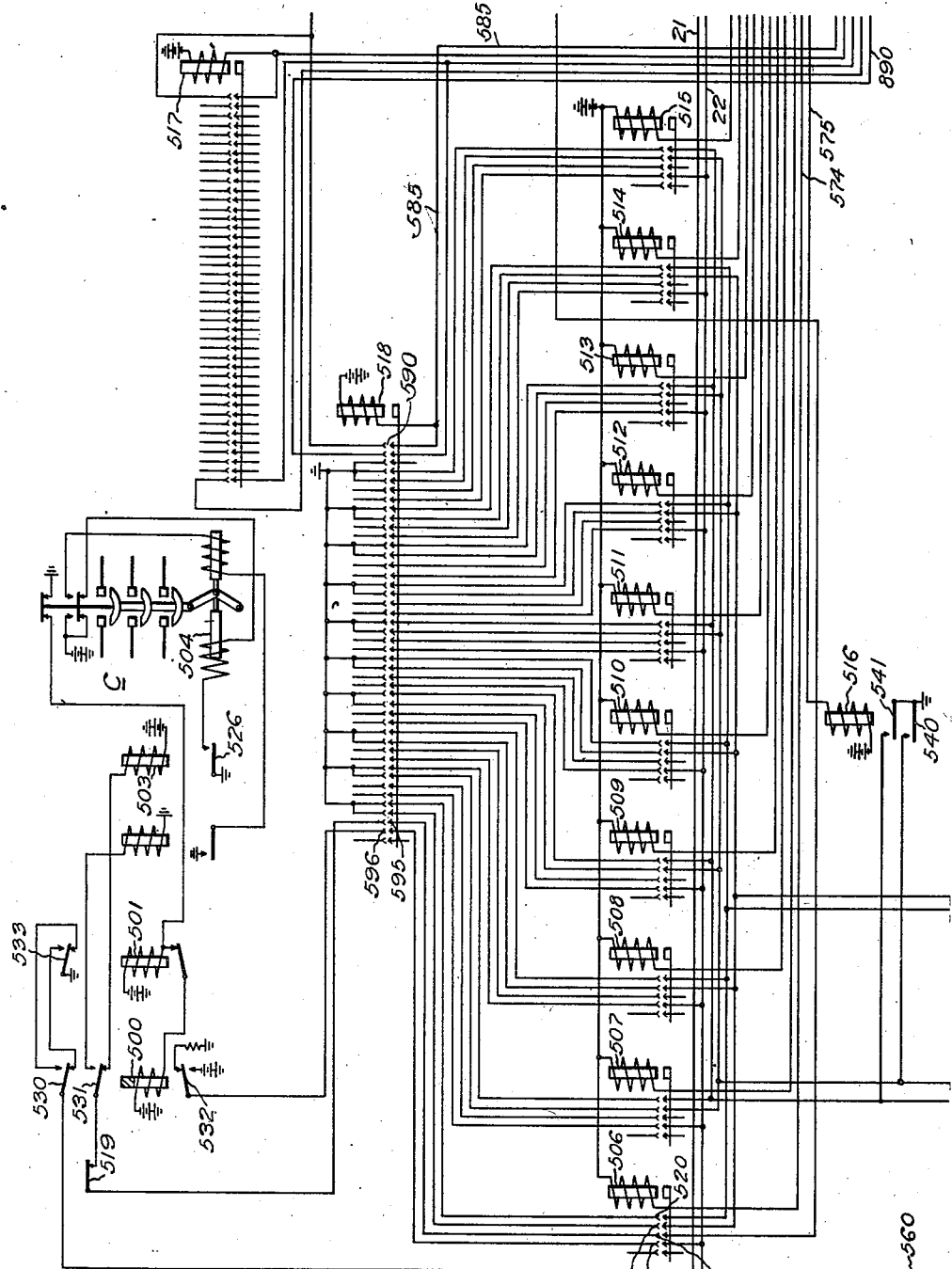

Referring to Fig. 5, relays 506 to 515 are the selecting relays at the station, and relays 517 and 518 are the switching relays for controlling the groups of apparatus units, of which circuit breaker C is an example.

Referring to Fig. 6, relay 600 functions to open and close the drive line under the control of relays 609 to 611, relays 612 to 614 and 615 to 617 are the groups of drive relays and relay 618 functions to transfer the drive circuit at the substation to its alternative connections. Relays 601 to 608 control the relaying of the drive impulses to the relay chain.

Figure 7:
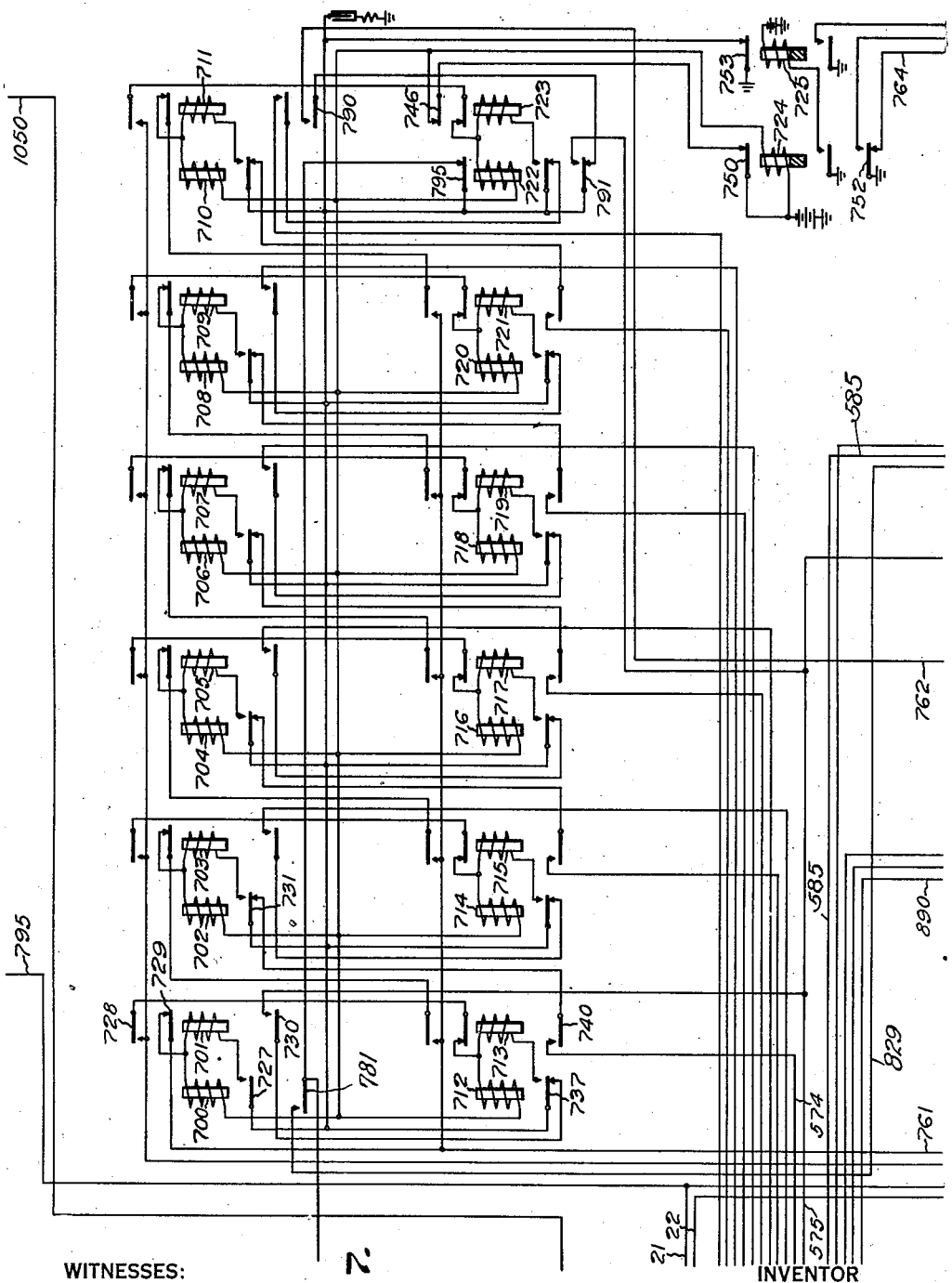

Referring to Fig. 7, relays 700 to 723 are the counting relays and relays 724 and 725 the locking and restoring-to-normal relays.

Figure 8:
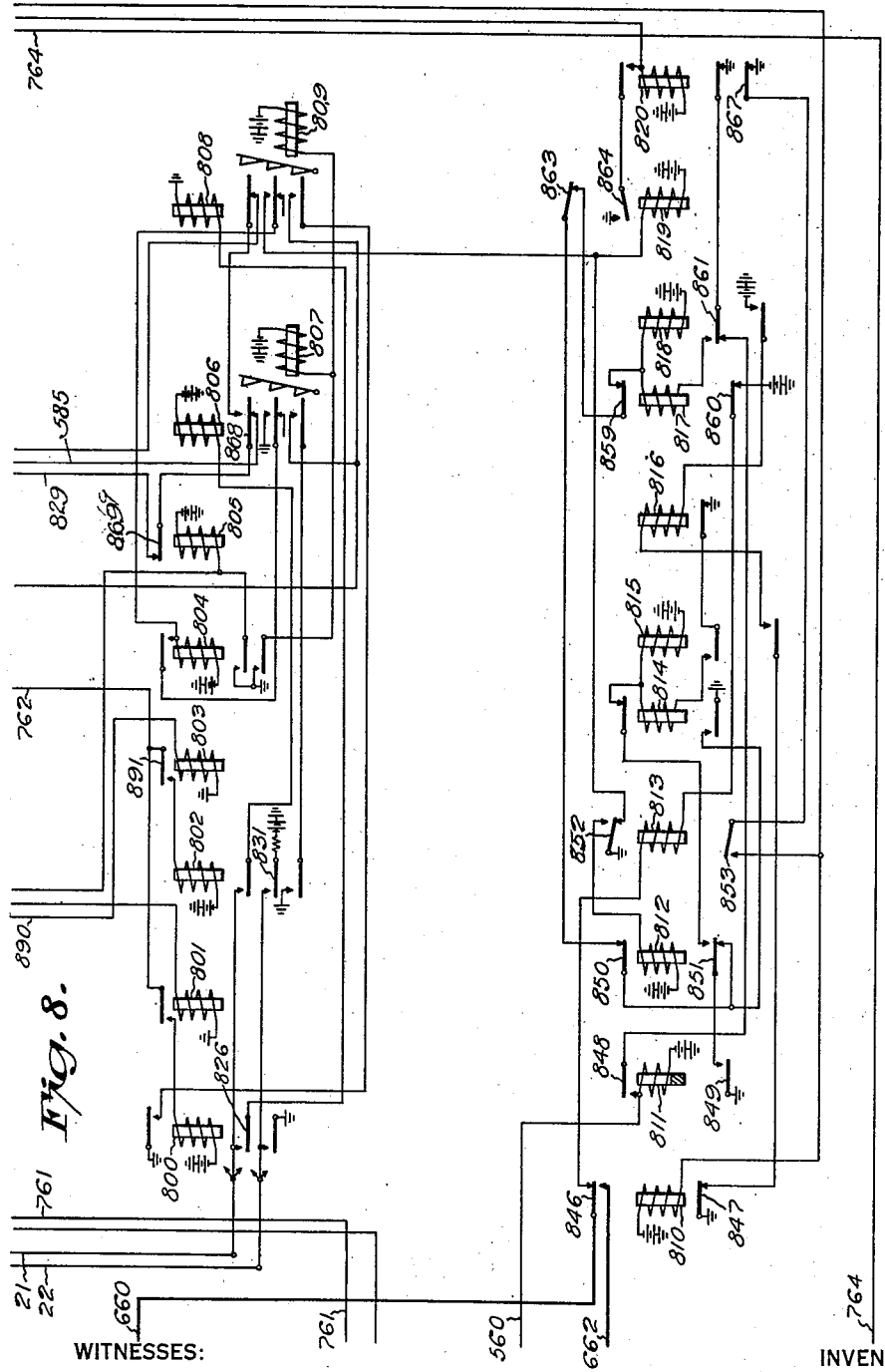

Referring to Fig. 8, relay 810 functions to switch the drive line from the normal to its operating position. Relays 811 to 819 are under control of the apparatus units for starting operations when an automatic operation takes place. Relays 800 to 809 control the switching operations.

Referring to Fig. 9 selector switches 901 to 904 are the finder switches and switches 905 to 908 are the code-transmitting switches all located at the dispatcher's office. Relay 909 steps the switches 900 to 904 and relay 910 steps the switches 905 to 908. Relay 911 controls the source of energy to the stepping magnet, relay 912 functions to transfer the source of energy from the stepping magnet 909 to the code sender after the finder switch has functioned. Relay 913 operates intermittently with the stepping magnet 909 to time the operation of the latter. Relay 914 has a vibrating armature for operating with relays 915 and 916 to produce an extra long pause at the twenty-fifth pulse for checking the synchronism of the selector switches. Relay 985 functions in a shunt circuit with the line relay 986 to operate the stepping magnet 910. Relays 917 to 919 function to produce the pauses in the twenty-five pulse system. Relay 920 maintains the normal operating circuits during the non-operating condition and the relays 921 and 923 operate to restore the apparatus to normal at any desired point.

Referring to Fig. 10, the switches 1000 to 1003 are the code-receiving switches at the substation under control of the relays 1004 to 1011 and are stepped by the stepping magnet 1012. Relays 1006 hold the operating circuit open and relays 1007 to 1011 control the selecting circuit. Relays 1013 and 1014 are the group-selecting relays and relays 1015 to 1017 are the final selecting relays.

In order to understand the general steps of operation, a brief description, thereof, will be given in connection with Fig. 11 which is a diagrammatic disclosure of the complete system. The operation of any key at the office such as 1100 functions to start the drive circuit 1101 into operation. The drive relays 1102 and 1103 operate to step a bank of counting relays 1104 and 1105 in synchronism, which in turn energizes the selecting relays 1106 and 1107 successively and in synchronism with each other. At the same time, the first switching relay 1108 at the dispatcher's office, and 1109 at the substation, are energized to connect banks of contacts such as 1110 and 1111 to the selecting relay contacts 1112 and 1113, respectively. As the selecting relays are energized one after another, the contacts, only four of which are shown, are energized successively thereby closing the circuit from the key through the contacts of the switch relay and over the contact of the selecting relays to the control line, while at the substation, the equivalent selecting relay is closing its contact to complete the circuit over the contacts of the first switching relay to the apparatus unit.

After the bank of selecting relays have all been energized, the switching relays 1114, at the office, and 1115 at the substation, operate to release all the counting relays and to prepare the counting and selecting relays for a second cycle of operation. Switching relay 1114 opens the energizing circuit for the switching relay 1108 and closes the circuit through the switching relay 1116 at the office while at the substation the switching relay 1115 opens the circuit for the switching relay 1109 and closes the circuit for the switching relay 1117. The selecting relays at both stations are now again energized in synchronism to close their contacts but since the second switching relay is now energized, the circuits will be completed consecutively to a second bank of units.

In this manner the same bank of selecting relays can be used repeatedly for connecting apparatus units, far in excess of the number, of selecting relays, to the line.

Not only does this arrangement considerably reduce the number of selecting relays necessary, but what is far more important, it reduces the number of contacts which must be closed in operating the system for a predetermined number of operations by reason of the fact that the same contacts of the selecting relays, are repeatedly used. Since the relay contacts used in these systems are often made with platinum tips, this represents a considerable saving in cost.

When the correct unit has been selected, the code sender 1118 is started into operation to transmit a code over the line to the code receiver 1119. This code is individual to the key operated and will close individual contacts 1120 corresponding to the code received. If the contact closed as a result of this code, corresponds to the contact closed on the selecting relay, the circuit will be completed to the apparatus unit over the contacts 1120, 1121 and 1122, to the apparatus unit shown.

As a result of the operation of the apparatus unit, a supervisory signal will be transmitted over the contacts 1126, 1123, and supervisory line s, contact 1124 and contact 1125, to the lamp thereby indicating to the dispatcher that the unit is operated.

In order to better understand the invention, I will now give a detailed description of the operations performed when the dispatcher desires to operate a circuit breaker.

Normally with the apparatus in a non-operating condition, there is an energizing circuit for the relay 214 at the office and the relay 813 at the substation which is completed over a circuit from ground at the office through back contact and armature 247, winding of relay 214, back contact and armature 257, conductor 262, back contact and armature 437, conductor 460, armature 619 and its back contact, conductor 660, armature 846 and its back contact, winding of relay 813, armature 860 and its back contact and battery to ground.

This circuit, it will be noted, is completed over the drive line and the armature 437 and 619 which will function, as will be hereinafter described, to periodically open the drive line during the stepping operations.

As a result of the energization of relay 214 at the office, an obvious energizing circuit is completed for the relay 211 over the armature 208 and its front contact. A further result of the energization of relay 214 is to complete an energizing circuit for the relay 215 over the armatures 243 and 249.

The energization of relay 211 previously mentioned, opens a locking circuit for the relay 210 at its armature. The energization of the relay 215 prepares an energizing circuit for the relay 212 which, as will appear hereinafter, functions, when energized, to open the normally-energized drive circuit and to start the operations.

One result of the energization of relay 813 is to open an obvious energizing circuit for the relay 812 and close an energizing circuit for the relay 819 at armature 852 and its front contact.

The energization of the relay 819 opens a locking circuit for the relay 820 at 864 and prepares an energizing circuit for the relay 818 at armature 863. When the dispatcher desires to operate a circuit breaker, he will move the start key K to its closed position and the individual key 320 associated with the apparatus unit which he desires to operate to the position shown.

Closing the key K completes an energizing circuit for the relay 212 from ground through battery, winding of the relay 212, back contact and armature 246, the closed contacts of the key K and front contact and armature 250 to ground. The energization of the relay 212 closes a series-locking circuit for the relays 212 and 213 in series at armature 245 and shunts the winding of relay 275 at armature 276. This series-locking circuit, however, is not effective to energize relay 213 at this time.

The key K is closed momentarily. Upon the opening of the key, the original energizing circuit for the relay 212 is opened at the contact of key K and the series-locking circuit for the relays 212 and 213 becomes effective. Upon the energization of relay 213, the normally closed drive line previously traced for the relays 214 and 813, is opened at armature 247. As a result of the deenergization of the relay 214, the energizing circuit for the relay 215 is opened at armature 249, the energizing circuit for the relay 211 is opened at armature 208.

The deenergization of the relay 215 opens a further point in the original energizing circuit for the relay 212 at armature 250.

A further result of the deenergization of relay 214 is to complete an energizing circuit for the relay 218 from ground through battery, winding of relay 218, the back contact and armature 249, and the armature 243 and its back contact to ground. The energization of the relay 218 transfers the drive circuit from its normal non-operating condition at armature 257 and its back contact to its operating condition at armature 257 and its front contact.

At the substation, as a result of the de-energization of the relay 813, due to the opening of the normal non-operating drive circuit at armature 247, as previously pointed out, an energizing circuit is completed for the relay 812 at armature 852 and its back contact, and an energizing circuit is completed for the relay 810 from ground through battery, winding of the relay 810, back contact and armature 853, the armature 867 and its back contact to ground.

The energization of the relay 812 opens the prepared circuit for the relay 818 at armatures 850 and 851 and prepares an energizing circuit for the relay 815 at armature 851. This function, as will be described more in detail hereinafter, is to prevent loss of supervisory signals resulting from the automatic operation of any circuit breaker during the period that a selecting operation is being performed by the dispatcher.

The energization of relay 810 transfers the drive circuit from its normal non-operating condition at armature 846 and its back contact to the operating condition at armature 846 and its front contact, and opens a prepared energizing circuit for the relay 816 at armature 847.

The first drive circuit is now completed from ground at the office through battery, back contact and armature 451, winding of relay 413, back contact and armature 439, conductor 263, front contact and armature 257, conductor 262, back contact and armature 437, conductor 460, armature 619 and its back contact, conductor 660, armature 846 and its front contact, conductor 662, armature 659 and its back contact, winding of relay 614, armature 649 and its back contact to ground.

The first drive impulse is transmitted over this circuit and it will be noted that it extends from battery at the dispatcher's office to ground at the substation.

In order to make the invention clear, the operations which take place simultaneously at the office and station will be described in succession, followed by the next series of operations.

As a result of the energization of relay 413, an energizing circuit is completed for the relay 415 at armature 448 and its front contact. Energization of relay 415 prepares a series-locking circuit for itself and winding 414 from ground through battery, winding of relays 414 and 415 in series, front contact and armature 453, back contact and armature 445 to ground over conductor 12, but this circuit is not effective at this time, due to the fact that the original energizing circuit for the relay 415 acts as a shunt. A further result of the energization of relay 415 is to open a possible series-locking circuit for the relays 411 and 412 at armature 452.

As a further result of the energization of relay 413 at the office, an energizing circuit is completed for the relay 401 at armature 447 and its front contact. The energization of relay 401 completes a locking circuit for itself from ground through battery, winding of relay 401, front contact and armature 423, the armature 419 and its back contact, conductor 12 and back contact and armature 162 to ground.

It will be noted that the locking circuits hereinafter described are all connected to ground over the conductor 12 at armature 162 which is operated at the completion of the operations to restore the apparatus to normal. The locking circuit for the relay 400 is opened at armature 470. An energizing circuit is completed for the relay 404 at armature 424 and an energizing circuit is completed for the first of the relay chains 111 from ground through armature 449 and its back contact, front contact and armature 425, conductor 19, armature 135 and its back contact, winding of relay 111, back contact and armature 139, back contact and armature 163 and battery to ground.

The energization of the relay 111 completes a series-locking circuit for the relays 111 and 110 from ground through armature 160 and its back contact, armature 138 and its front contact, windings of relays 110 and 111 in series, back contact and armature, 139, back contact and armature 163 and battery to ground, but this circuit is not effective at this time, due to the fact that the original energizing circuit for the relay 111 shunts the winding of relay 110. A further result of the energization of relay 111 is to complete an energizing circuit for the relay 315, from ground through battery, the winding of the relay 315, the back contact and armature 219, the armature and back contact of relay 204, the front contact and armature 137, back contact and armature 119, back contact and armature 160 to ground.

Simultaneously with the energization of relay 111, it will be recalled that the relay 404 was energized over a circuit including armature 424. The energization of the relay 404 completes an energizing circuit for the relay 408 from ground through battery, armature 431 and its front contact, back contact and armature 432, armature 433 and its back contact, the winding of relay 408, and back contact and armature 458 to ground. The energization of the relay 408 opens the drive line at armature 437 and prepares an energizing circuit for the relay 418 at armature 438 and its front contact.

The operations thus far traced at the office function in approximately the order in which they have been described, and may be termed a half-cycle operation, the other half being performed during the period that the drive line is open at armature 437 as a result of the energization of the relay 408 just described.

Before, however, describing further these operations, the operations which have been taking place at the station simultaneously with those just described, will now be given.

It will be recalled that in the first drive circuit traced, the relay 614 was energized. As a result of the energization of the relay 614, an obvious energizing circuit is completed for the relay 612 over armature 651 and its front contact and an energizing circuit is completed for the relay 607 over the armature 650 and its front contact.

The energization of the relay 612 opens a possible series locking circuit for the relays 615 and 616 at armature 645 and prepares a series locking circuit for the relays 612 and 613 at armature 646 from ground through battery, winding of relays 612 and 613 in series, front contact and armature 646, back contact and armature 652, conductor 764 and back contact and armature 752 to ground. But this circuit is not effective at this time due to the fact that the original energizing circuit for the relay 612 shunts the winding of relay 613.

The energization of relay 607 previously traced, completes a locking circuit for itself from ground through battery, winding of relay 607, front contact and armature 632, armature 636 and its back contact, conductor 764, back contact and armature 752 to ground, opens a locking circuit for the relay 608 at armature 633, closes an energizing circuit for the relay 604 at armature 634 and its front contact, and closes an energizing circuit for the first relay in the counting chain at armature 635, from ground, over the back contact and armature 647, armature 635 and its front contact, conductor 761, armature 729 and its back contact, winding of relay 700, back contact and armature 746, back contact and armature 750, and battery to ground.

The energization of relay 700 completes a series locking circuit for itself and relay 701 from ground through battery, armature 750 and its back contact, armature 746 and its back contact, winding of relays 700 and 701 in series, front contact and armature 727, and back contact and armature 753 to ground, but this circuit is not effective at this time due to the fact that the original energizing circuit for the relay 700 shunts the winding of relay 701.

The result of the energization of the relay 700 is to complete a circuit for relay 518, from ground, through battery, the winding of relay 518, conductor 585, the back contact and armature 868, armature 869 and its back contact, conductor 829, the front contact and armature 781, back contact and armature 795, and the back contact and armature 753, to ground. Relay 518 is thus energized and, upon its energization, locks itself over its first contact and over the back contact and armature 795 to ground, as traced above. In this manner, energization of the first counting relay, controls the group selecting relays 518, 517 and, similarly, the last counting relay 722 opens the energizing circuit for these relays at the armature 795.

During the second cycle of operations, the relay 806 is energized in a manner described in detail above, and the circuit for armature 781 extends to the relay 517 for the succeeding group of contacts.

The energization of the relay 604 completes an energizing circuit for the relay 600 from ground through battery, armature 626 and its front contact, back contact and armature 625, armature 622 and its back contact, the winding of relay 600 and back contact and armature 640 to ground. The energization of the relay 600 opens a further point in the drive circuit at armature 619 and prepares an energizing circuit for the relay 609 at armature 620.

The energizations of the relay 600 and relay 408 occur simultaneously, these operations at the station having been performed in approximate synchronism with those previously described at the office. This completes, as has already been stated, the first half cycle of operations, the remaining half being performed during the period which now follows, while the drive line is open.

The results of the opening of the drive line at the office, will first be described. The relay 413 is deenergized due to the opening of the drive line and as a result, opens the original energizing circuit for the relay 415 at armature 448, and the original energizing circuit for the relay 401 at armature 447. The relay 401 being locked over its armature 423, is not effected by the opening of its original energizing circuit. As a result of the opening of the original energizing circuit for the relay 415, the series locking circuit for the relays 415 and 414 is completed.

Energization of the relay 414 opens a further point in the original drive circuit at armature 451, opens a further point in the original energizing circuit for the relay 415 at armature 450 and opens the original energizing circuit for the relay 111 at armature 449.

As a result of the opening of the original energizing circuit for the relay 111, the series locking circuit for the relays 111 and 110, previously traced, now becomes effective. As a result of the energization of the relay 110, a further point in the original energizing circuit for the relay 111 is opened at armature 135, a circuit is prepared for the relay 123 at armature 134 and a circuit is completed for the relay 317 from ground through battery, winding of relay 317, conductor 33, front contact and armature 136, the back contact and armature 154, back contact and armature 139, the back contact and armature 163 and battery to ground. The energization of the relay 317 completes energizing circuits for the relay 407 at armature 371 and relay 417 at armature 372.

A result of the energization of relay 407 is to complete an energizing circuit for the relay 402 which locks itself up over armature 427 and armature 429 and back contact to ground, over conductor 12. The energization of relay 402 opens the locking circuit for the relay 403 at armature 428 and completes an energizing circuit for the relay 409 at armature 426.

The energization of the relay 417 completes an energizing circuit for the relay 418 from ground through battery, armature 454 and its back contact, front contact and armature 456, winding of relay 418, armature 457 and its front contact, back contact and armature 455 and armature 438 and its front contact to ground.

The energization of the relay 418 over the circuit just traced, opens the energizing circuit for the relay 408 and completes a locking circuit for itself at armature 458 and its front contact. This completes the second half cycle of operation at the office during the opening period of the drive line.

Simultaneously with the operations just described, the following operations take place at the sub-station. The relay 614 is deenergized when the drive line is opened, and opens the original energizing circuits for the relay 607 at armature 650 and the relay 612 at the armature 651. Since the relay 607 has locked itself up, the opening of its original energizing circuit has no effect upon it. Opening of the original energizing circuit of the relay 612 makes the series locking circuit for the relays 612 and 613 effective. The energization of the relay 613 opens a further point in the drive line at armature 649, opens a further point in the energizing circuit for the relay 612 at armature 648 and opens the original energizing circuit for the first counting relay 700 at armature 647.

The series locking circuit for the relays 700 and 701 now becomes effective. The energization of the relay 701 opens a point in the original energizing circuit for the relay 700 at armature 729, prepares an energizing circuit for the relay 712 at amature 728 and closes an energizing circuit for the relay 516 from ground through battery, winding of the relay 516, conductor 575, front contact and armature 730, back contact and armature 737 and back contact and armature 753 to ground. The energization of the relay 516 completes an energizing circuit for the relay 601 at armature 540 and the relay 610 at armature 541. The energization of relay 601 completes an energizing circuit for the relay 606 over armature 621 and its front contact.

The energization of relay 606 completes a locking circuit for itself, from ground through battery, winding of relay 606, front contact and armature 630, armature 627 and its back contact to ground over conductor 764 and opens a locking circuit for the relay 605 at armature 631. A further result of the energization of the relay 606 is to complete an energizing circuit at the relay 618 over armature 629.

The energization of the relay 610 completes an energizing circuit for the relay 609 from ground through battery, armature 643 and its back contact, the front contact and armature 641, the winding of relay 609, armature 642 and its front contact, the back contact and armature 644, and armature 620 and its front contact to ground. The energization of the relay 609 completes a locking circuit for itself over armature 640 and opens the energizing circuit for the relay 600. This completes the second half cycle of the first cycle of operations at the sub-station. It will be recalled that the relays 600 and 408 were energized simultaneously to open the drive line at the end of the first half cycle of operations. Now, these two relays are deenergized simultaneously at the completion of the second half of the first cycle of operation.

The drive line is now again closed but since the relay 409 at the office and the relay 618 at the sub-station have been energized, the circuit now completed will operate from ground, at the office, back contact and armature 444, winding of relay 410, the front contact and armature 439, conductor 263, the front contact and armature 257, conductor 262, back contact and armature 437, conductor 460, the armature 619 and its back contact, conductor 660, the armature 846 and its front contact, conductor 662, armature 659 and its front contact, winding of relay 617, armature 656 and its front contact and battery to ground.

This is the second drive impulse and it will be noticed that it is distinguished from the first impulse traced in that the circuit is now completed from ground at the office to battery at the substation, whereas the first impulse was from battery at the office to ground at the substation.

Attention is now called to the connections of the relays 410 and 413 at the office and the relays 617 and 614 at the substation, which are the line drive relays. By these circuit arrangements, impulses of periodic reversed polarity, are impressed on the drive line, each of these neutral relays are responsive to only one of these polarities. In this manner, unless the drive circuit functions properly and in synchronism at both stations, no circuit will be completed, as there will be either a ground to ground or battery to battery connection, either of which will fail to cause any operations.

It will also be noticed from the circuits just traced, that the drive circuit when first completed functions to open its own connection and energizes a counting relay which, when properly energized, operates to transfer the drive circuit to its alternative connection and to reclose the drive circuit. By this interconnected operation, very accurate synchronization is maintained.

In view of the fact that the operations which took place following the first drive impulse which were traced in detail and the cycles which follow are similar, a very brief description of the second cycle of operations will be given without tracing the now obvious circuits, in order to bring out some slight variations which, however, thereafter repeat themselves.

Upon the energization of the relay 410 at the office, the relays 412 and 400 are energized. Energization of the relay 400 completes an energizing circuit for the relay 123, which is completed over the armature contacts 134 of the relay 110. The energization of relay 123 opens the energizing circuit for the relay 317 which, in turn, opens the energizing circuit for the relays 407 and 417.

The energization of the relay 400 also opens the locking circuit for the relay 401 and closes an energizing circuit for the relay 405. Since the relay 404 is de-energized upon the de-energization of the relay 401, an energizing circuit is completed for the relay 408. This completes the first half of the second cycle at the office.

During this period, at the substation, upon the energization of relay 617, an energizing circuit is completed for the relays 615 and 608. The energization of relay 608 opens the locking circuit for the relay 607, completes its own locking circuit and completes an energizing circuit for the relay 603.

A further result of the energization of relay 608 is to complete an energizing circuit for the second pair of counting relays 712 over armature 639 and the armature 730 of the first counting relays.

The energization of the relay 615 prepares a series locking circuit for itself and relay 616, which is not effective at this time, and opens the locking circuit for the relays 612 and 613. The energization of relay 712 prepares a series-locking circuit for itself and relay 713, in series, which is not effective at this time, and opens, at armature 737, the energizing circuit for the relay 516. The de-energization of the relay 516 opens the energizing circuit for the relays 601 and 610. The de-energization of the relay 610 opens the locking circuit for the relay 609, which thereupon completes an energizing circuit for the relay 600 following the energization of relay 603. The drive line is now opened at armature 619 simultaneously with the opening of the drive line at armature 437, already described.

The opening of the drive line opens the energizing circuit for the relay 410. The de-energization of relay 410 opens the original energizing circuit for the relays 400 and 412, the relay 400 being locked is not effective at this time, and the series locking circuit for the relays 412 and 411 now becomes effective. The energization of relay 412 opens the locking circuit for the relays 414 and 415 in series and opens the original energizing circuit for the second pair of counting relays, thereby energizing the relay 122.

The energization of the relay 122 prepares an energizing circuit for the third pair of counting relays 108 and 109 and closes an energizing circuit for the first selecting relay 314, which is completed from ground, through battery to winding of relay 314, conductor 32, the front contact and armature 153, back contact and armature 133, and back contact and armature 160 to ground.

The latching relays 300 and 301 are operated in response to supervisory signals transmitted when the unit at the substation individual to these relays operates. The position of these latched relays are therefore, determined by the condition of the remote circuit breaker or apparatus unit. The key 320, on the other hand, is manually operated and may therefore be in disagreement with the apparatus unit or its individual latching relay. When the key 320 is in disagreement an operating circuit is prepared over its contacts and the contacts of the latching relays which is completed when the selecting apparatus reaches this key and the master key K—1 is closed. The contacts for controlling the driving circuit are completed through the latching relays contacts and the individual key 320, so that when the key is in disagreement the drive circuit cannot function. The details for this operation are described in a later portion of the specification. It will be evident that when the remote unit operates in response to the impulse transmitted when the individual key is positioned to disagreement with the latching relay and a supervisory signal is transmitted back in response to the operation of the unit for positioning the latching relay to agreement with the individual key that this will automatically open the operating circuit for the remote unit so that although the remote unit again changes its position, no further operating circuit is completed at this time.

Assuming the position of the key 320 agreed with the condition of its associated unit, the energization of the selecting relay 314 completes energizing circuits for the relays 406 and 416 over its two extreme left-hand contacts 380 and 381 and connects the control and supervisory line 21—22 over the contacts 382 and 383 to the contacts of the first switch relay 315. The energizing circuit for the relay 406 is completed from ground through battery to the winding of the relay 406, contact 381, through the contact of relay 315, contacts of the stop key, armature of relay 300 and its back contact, through the left hand contact of key 320 in its upper position to ground. The circuit for the relay 416 is completed from ground through battery, through the winding of relay 416, contact 380, the last contact of the switchover relay 315 to ground. The energization of the relay 406 completes an energizing circuit for the relay 403, which opens the locking circuit for the relay 402 and closes its own locking circuit. The opening of the locking circuit for the relay 402 opens the energizing circuit for the relay 409 to switch the drive circuit back to its first position.

The energization of the relay 416 completes an energizing circuit for the relay 418, which is energized and locked. The energization of the relay 418 opens the energizing circuit for the relay 408 and again closes the drive line and the last half of the second cycle is completed at the office.

Upon the opening of the drive line and the consequent de-energization of the relay 617, the original energizing circuits for the relays 608 and 615 are opened. The relay 608 being locked is not effective at this time. The relay 616 is energized now to open the original energizing circuit for the relay 712.

The relay 713 is now energized, which prepares an energizing circuit for the third pair of counting relays 702 and 703 and completes an energizing circuit for the first selecting relay at the substation from ground, through battery, winding of relay 506, conductor 574, front contact and armature 740, back contact and armature 731 and back contact and armature 753 to ground.

The energization of the first selecting relay 506 completes energizing circuits for the relays 602 and 611 over the contacts 520 and 521, closes the control and the supervisory lines 21—22 over the contacts 522 and 523 to the first bank of contacts controlled by relay 518. The energizing circuit for the relay 602 is completed from ground through battery, through the winding of the relay 602, contact 520, the contact of the switchover relay 518 to ground. The energizing circuit for the relay 611 is completed from ground to battery, through the winding of the relay 611, contact 521, through the contact of the switchover relay 518 to ground. It will be understood, of course, that the switchover relay 518 was energized following the energization of the first counting relay 700 in a manner similar to the energization of relay 315, which was described in detail above. The circuit for the relay 518 is complete from ground through battery, through the winding for the relay 518, conductor 585, over the back contact and armatures of relay 806, the armature 869 and back contact of relay 805, conductor 829, the front contact and armature 781 of relay 700, back contact and armature 795, and back contact and armature 753 to ground.

The energization of the relay 602 completes an energizing circuit for the relay 605, which locks itself and opens the locking circuit for the relay 606. The de-energization of relay 606 opens the energizing circuit for the relay 618 and the drive circuit is returned to its original first impulse position.

The energization of the relay 611 completes an energizing circuit for the relay 609, which locks itself up and opens the energizing circuit for the relay 600. The de-energization of relay 600 takes place simultaneously with the de-energization of relay 408. The drive circuit is now again completed over its originally traced circuit from battery at the dispatcher's office to ground at the substation.

The operations just traced continue from step to step through the counting chain, which, in turn, operate the selecting relays until the entire bank of counting relays and selecting relays have been operated. When the last counting relays 112 and 113 at the office are energized, the shunt for the winding of the relay 125 is opened at armature 139 and these relays are energized in a series circuit with the relay 125. The resistance of the winding of the relay 125 is made low in order to be able to operate in series with these relays. Upon energization of the relay 125, an energizing circuit is completed for relay 124 at armature 164. The energization of relays 124 and 125 thereupon open all the locking circuits at armatures 163, 160 and 162.

The relay 210 is now energized over a circuit from ground, through battery, winding of relay 210, the conductor 11 and front contact and armature 162 to ground. The energization of the relay 210 completes a locking circuit for itself over armature 241, opens a series locking circuit for the relays 212 and 213, at armature 242, and opens an energizing circuit for the relay 215 at armature 243.

The original non-operating circuit previously traced is now again completed to energize the relay 214 at the office and the relay 813 at the substation.

In the manner thus described, the counting relays are energized in sequence and in synchronism at each station by means of the drive relays to, in turn, energize their individual selecting relays. The energizations of these selecting relays successively connect keys at the office and associated units at the substations, through the particular switching relay which happens to be energized, to the control line.

When the 11th pair of counting relays 100 and 101 are energized at the office, the energizing circuit for the relays 206 previously mentioned is completed over a circuit from ground through battery, winding of relay 206, front contact and armature 260, the front contact and armature 175, back contact and armature 176, and back contact and armature 160 to ground.

At the substation, the eleventh pair of counting relays completes an energizing circuit for the relay 803, from ground through the winding of relay 803, conductor 890, the contact 590 of the bank controlled by the relay 518, winding of relay 805, and battery to ground. The energization of the relay 803 completes an energizing circuit through relay 802 from ground to battery, front contact and armature 891, conductor 762, the front contact and armature 790, back contact and armature 791 and back contact and armature 753 to ground.

The energization of the relay 802 at the substation and the relay 206 at the office completes energizing circuits over the control and supervisory lines for operating the latching mechanism which controls the step-over from the first to the second switching relays at the office and substation.

Over the supervisory line a circuit is completed from ground through the winding of relay 200, armature 233 and its front contact, supervisory conductor 22, front contact and armature 831 at the substation and battery to ground. Over the control line a circuit is completed from ground through winding of relay 808 at the substation, armature 826 and its front contact, conductor 21 and front contact and armature 290 to ground. The armatures of relays 200 and 806 are latched by the armatures of relays 201 and 807 respectively. The energization of the relay 200 at the office prepares a circuit for the second switching relay 316 at armature 219 and its front contact and similarly, the energization of the relay 806 prepares an energizing circuit for the second switching relay 517.

When the last pair of counting relays are energized the energizing circuit for the relay 206 at the office is opened at armature 176 and the energizing circuit for the relay 802 is opened at armature 791. Simultaneously, the locking circuit for the switching relay 315 at the office is opened at the armature 119 and the locking circuit for the switching relay 518 at the substation, is opened at armature 795. These switching relays are thereby deenergized to open their banks of contacts.

Upon the energization of the last pair of counting relays, the relay 125 is energized in a series circuit with any of the pairs of counting relays, by reason of the fact that its shunt is opened at armature 139. This circuit is completed from ground through battery, winding of relay 125, series windings of any pair of counting relays, back contact and armature 160 to ground.

The energization of relay 124 previously described above removes ground from the conductor 12, thereby opening all of the locking circuits which obtain their ground connection over this conductor and places ground upon the conductor 11 to energize relay 210. Since, at this time, the relay 211 is deenergized, the relay 210 locks itself over the armature 241. It will be recalled that during this operating period, the relays 212 and 213 have been energized in series.

As a result of the energization of the relay 212, the relay 275 has been shunted at armature 276. Upon the energization of the relay 210, the series locking circuit for the relays 212 and 213 in series, is opened at armature 242. The relay 212 is now deenergized and opens the shunt circuit for the relay 275, at armature 276 and the relay 275 is again energized. A circuit is now again completed for the relay 212 from ground, armature 295, and its front contact, armature 296 and its front contact, armature 246 and its back contact, the winding of relay 212 and battery to ground.

The energization of the relay 212 now again shunts the winding of relay 275 which, upon deenergization, opens the original energizing circuit for the relay 212 at armature 296. Relays 212 and 213 are now energized in series and the second cycle of operations is repeated, during which the counting relays are all again energized in a manner as already described, to again sequentially energize the selecting relays.

Upon the energization of the first of these counting relays, the prepared energized circuit for the second switching relay 316 is completed over armature 137 to connect the bank of contacts controlled by the switching relay 316 to the selecting relays. This circuit is completed from ground through battery, through the winding of the relay 316, the back contact and armature of relay 202, front contact and armature 219 of relay 200 energized, and thence over the armatures of relays 204 and 111 as traced in detail above for relay 315. The keys associated with this bank, of course, are different from those associated with the bank controlled by relay 315.

At the completion of this cycle of operations, performed in a manner already described in connection with relay 315, a third switching relay will be energized. At the completion of each cycle, the relays 206 and 209 at the office, and the relays 800 and 802 at the substation will alternately energize. The energizing circuit for relay 207 is completed over contacts of the relay 315, while the energizing circuit for the relay 208 is completed over the contacts of relay 316. Relays 207 and 208 thus energize sequentially. The energizing circuit for the relay 206 is controlled by relay 207 and the energizing circuit for the relay 209 is controlled by relay 208. The energizing circuits for these relays 206 and 209 are completed over the front contact and armature 175 so that these relays energize sequentially at the end of each cycle of operation, the one relay energizing at the end of one cycle and the other relay energizing at the end of the succeeding cycle. Similarly, relays 800 and 802, the circuits for which are completed over contacts of relays 801 and 803 respectively, are energized sequentially, each at the end of a cycle by circuits completed over conductor 762 and the front contact and armature 790.

Thus, at the end of the first cycle, a circuit is completed over the supervisory line from ground at the office, to battery at the substation, for operating the step-over relay controlling the switching relays and from battery at the substation over the control line to ground at the office, for controlling a switch over relay at the office.

At the end of the next cycle of operations, a circuit is completed from battery at the office over the supervisory line to ground at the substation, and from ground to the substation to battery at the office. This alternate operation insures against the false switching relay operation.

At the end of each cycle of operation, the relay 124 energizes and closes at its armature 162 an energizing circuit for the relay 210. When the relay 125 deenergizes, there is no longer any energizing circuits for the relay 218. A similar operation takes place at the substation so that the holding circuit for the relay 214 is again completed. Upon energization of the relay 214, an energizing circuit is completed for the relay 205 from ground through battery, through the winding of the relay 205, the armature and upper contact of relay 203 and the front contact of relay 214 to ground. Relay 205, upon energization completes obvious energizing circuits for the latching relays 201 and 203.

When the proper switching relay, controlling the particular key which has been operated, is energized to connect this key to the selecting relays and the selecting relay individual thereto has been operated, the energizing circuit for either relay 416 and 417 which function to deenergize the relay 408 to then close the drive line is not completed, when the position of that key and its associated latching relay which is operated by supervisory signals in response to operations of its individual circuit breaker at the substation, are not in agreement. If therefore, while the circuit breaker is in a tripped position and the latching relays are in an equivalent position, the key is moved to a position for closing the breaker, it will not be in agreement with the latching relays and no energizing circuit will be completed for the relay 416 or 417. The stepping operation is therefore stopped at this point.

A lamp is associated with each selecting position controlled by the switch-over relay 315. These lamps are illuminated sequentially to indicate which of the selecting relays is energized. A stop key is also associated with each selecting position which, when opened, controls the circuit to the relay 406 or 416, which in turn control the drive circuit operation as has been explained in detail above.

Heretofore, operations were performed over the control and supervisory line when the selecting device is stopped at the key operated. However, since it is desirable to obtain the greatest possible factor of safety of operation in supervisory control, I have incorporated in the synchronous relay system the circuit arrangements disclosed in Figures 9 and 10, whereby a code is now transmitted from the control to the supervisory line to identify the selection made. If the selection made by the synchronous relay system and that made by the code correspond, an energizing circuit is completed for performing the desired operation.

In order to transmit this code, the dispatcher will operate the key 900, which as a result, will complete an energizing circuit for the relay 922. The energization of the relay 922 completes an energizing circuit for the stepping magnet 909, from ground through armature 940 and its back contact, armature 941 and its front contact, armature 942 and its back contact, conductor 943, winding of the stepping magnet 909, back contact and armature 944, back contact and armature 945, back contact and armature 946 and battery to ground. The energization of the relay 922 also prepares a series locking circuit for itself and relay 921 which, however, is not effective at this time due to the shunt circuit. If the dispatcher desires to stop the transmission of a code at any time, it is only necessary to open the contacts of the key 900. Relay 921 will thereupon energize and open the energizing circuit for the stepping magnet 909 and will complete an energizing circuit for the relay 923 which in turn will cause deenergization of the relays 921 and 922.

The energization of the stepping magnet 909 positions its pawl to step the wipers 901 to 904 from their first to their second contact, and completes an energizing circuit for the relay 913, from ground through armature 948 and its back contact, winding of relay 913, the contact of the stepping magnet 909, back contact and armature 945, back contact and armature 946 and battery to ground. Relay 913, when energized, opens the stepping magnet circuit at armature 944, which thereupon steps the wipers from their first to their second contact.

The deenergization of the relay 909 opens the energizing circuit for the relay 913, which, being slow to release, deenergizes after an interval of time, to again close the stepping magnet circuit for the relay 909 as previously traced. In this manner the relay 913 causes the stepping magnet 909 to intermittently energize and deenergize to step the wipers 901 to 904 from contact to contact.

The switches 901 to 904 are called finder switches, since they rotate to find which key has been operated. Associated with each contact of the switch 901 is a key, and the switch will rotate until the operated key is found, when a circuit will be completed from ground, through wiper of switch 901, its second contact, conductor 950, contact 321 of the twist key 320 in its upper position, the back contact and armature 398, conductor 399, to winding of relay 912 and battery to ground. The energization of the relay 912 opens the energizing circuit for the stepping magnet 909 at armature 945, and completes an energizing circuit for the relay 914 from ground through battery, armature 946 and its back contact, armature 945 and its front contact, the winding of relay 914, switch 906 and its wiper, to ground.

The battery having been removed from the stepping magnet 909, the wipers of the finder switches 901 to 904 will remain on their second contact, which happens to be individual to the key operated. The energization of the relay 914 completes an obvious energizing circuit for the relay 916, which in turn, completes an obvious energizing circuit for the relay 915. The energization of the relay 915 opens an energizing circuit for the relay 920 and locks the relay 912 at armature 950.

The deenergization of the relay 920 completes an energizing circuit for the relay 918, from ground, battery, armature 951 and its back contact, the winding of relay 918, and armature 952 and its back contact, to ground.

The energization of the relay 918 completes an energizing circuit for the relay 917 at armature 953. A circuit is now completed for the stepping magnet 910, controlling the second group of switches 905 to 908, from ground, battery, armature 951 and its back contact, first contact of the switch 907 and its wiper, winding of the stepping magnet 910, the front contact and armature 955, armature 956 and its front contact, and back contact and armature 957 to ground. It is understood, of course, that upon the energization of relay 916, energizing circuits are completed for the relays 985 and 986, in a shunt circuit from ground, armature 948 and its back contact, windings of relays 985 and 986, armature 975 and its contact, the contact of stepping magnet 910 and battery to ground.

Upon the energization of the stepping magnet 910 its prepares its pawl to step the wipers 905 to 908 from their first to their second contact, and its contact opens the energizing circuit for the relays 985 and 986. The deenergization of the relay 985 opens the energizing circuit for the stepping magnet 910 at armature 955, which in turn, deenergizes to step the wipers of the switching mechanisms 905 to 908 from their first to their second contact. In this manner, the relay 985 causes the stepping magnet 910 to intermittently operate to step the wipers 905 to 908 from contact to contact and in the meanwhile, the relay 986 is energized with the relay 985 to periodically transmit impulses over the line from ground to battery, armature 935 and its front contact, conductor 976, through upper contact 322 of key 320, back contact and armature 324, upper contact of key K—1, contact 393, the conductor 21, conductor 795 and winding of relay 1004 to ground.

When the wiper of the switch 905 reaches its third contact, a circuit is completed from ground through the wiper of switch 904, the first group of contacts over the third contact of switch 905, its wiper, winding of relay 919 and battery to ground. The energization of relay 919 opens the energizing circuit for the stepping magnet 910 at armature 957 and opens the energizing circuit for the relay 918 at armature 952. The deenergization of the relay 918 opens an energizing circuit for the relay 917, which, after an interval, deenergizes and its armature drops to its back position.

A circuit is then completed for the stepping magnet 910 over the front contact of armature 957, and back contact and armature 956. The deenergization of the stepping magnet prepares its pawl to step its wipers, opens the energizing circuit for the relay 985, which in turn, deenergizes the stepping magnet 910 to step the wipers from their third to their fourth contact. The relay 919 is now deenergized, to in turn, complete a circuit for the relay 918 over the circuit previously traced, which in turn, completes an energizing circuit for the relay 917 and the original energizing circuit for the stepping magnet is now again completed. During this period, however, an extra long pause or impulse period occurs, which, as will be described hereafter, is part of the code system.

The wipers of the switches 905 to 908 now continue to step from contact to contact until the wiper of switch 905 reaches its fifteenth contact, when an energizing circuit is completed for the relay 919 over the wipers of switches 905 and 902. This, in the manner already described, energizes relay 919, which in turn, deenergizes relays 918 and 917 to produce the second pause, after which the wipers of the switches 905 to 908 continue to step from contact to contact until they reach the twenty-fifth contact, at which point the stepping magnet circuit is opened at the wiper of switch 907. An energizing circuit is completed for the relay 911 from ground through battery, winding of relay 911, twenty-fifth contact of the switch 906, and its wiper to ground.

The energization of relay 911 opens the energizing circuit for relay 914 at armature 946 and the apparatus is restored to normal in the following manner. The deenergization of relay 914 will cause its armature which is of a wiggle-tail type to operate between its contacts for a period of time maintaining the relays 915 and 916 energized. After an interval, however, the armature will come to rest at its mid-position and the relays 915 and 916 will be deenergized. Upon the deenergization of the relay 915 an energizing circuit is completed for the relay 920, at armature 950 and its back contact, and the signalling impulse over the line 399 is stopped. Energization of relay 920 completes an energizing circuit for the relay 923 and stepping magnet 910. The circuit for the relay 923 is completed from ground over the armature of relay 921 and its front contact through the winding of the relay 923, the twenty-fifth contact of selector switch 907, its wiper, front contact and armature of the relay 920 and its front contact, to the switch 908 and battery to ground.

The energization of the relay 923 opens the circuit for the relays 921 and 922 and these relays deenergize. A multiple circuit is completed for the stepping magnet 910 from ground, over the armature of relay 920 and its front contact, stepping magnet 910 and thence in multiple with the circuit traced above, to ground over the switch 908. The energization of the stepping magnet 910 operates its pawl to step the switches to their first contact. Relay 918 deenergizes when the switches reach their twenty-fifth contact and in turn opens the energizing circuit for the relay 917. In this manner, the apparatus is restored to normal. At the substation, the energization of the relay 1004 completes an energizing circuit for the relay 1005, over armature 1025 and completes an energizing circuit for the relay 1012 at armature 1026. The stepping magnet operates its pawl preparatory to stepping the wipers of the switches 1000 to 1003 from their first to their second contact. The energization of the relay 1005 opens a vibratory circuit for the stepping magnet 1012 at armature 1027, prepares an energizing circuit for the relay 1006 at armature 1028, and prepares an energizing circuit for the relay 1007 at armature 1029.

At the end of the first impulse, the relay 1004 is deenergized to complete an energizing circuit for the relay 1007, over armature 1025 and its back contact, and armature 1029 and its front contact. The wipers are stepped from their first to their second contact, and an energizing circuit is completed for the relay 1006 from ground through battery, winding of relay 1006, armature 1028 and its front contact, the first contact of the switch 1003 and its wiper, to ground.

The relay 1006 is energized to open the operating circuits at armature 1030. The relay 1007 is energized to complete an energizing circuit for the relays 1008 and 1009 at armatures 1031 and 1032, respectively Relays 1008 and 1009 are energized to open the selecting circuits at armatures 1033 and 1034. The relay 1010 is energized over the wipers of switch 1001 to prepare a locking circuit for the relay 1011 at armature 1035, and a locking circuit for the final selecting relay at armature 1036. The relay 1004 is now energized by the code impulses as a result of the intermittent energization and deenergization of the relay 916 at the office. At the third pulse period, it will be recalled that a pause occurred during which the relays 916 and 915 were energized. As a result, the relay 1004 is energized during the pause period.

It will be noted that the relays 1008 and 1009 are energized over alternate points of the switch 1002. During the third pause, the wiper of the switch being on its third contact, completes an energizing circuit for the relay 1008. Since, however, relay 1009 is opened during this period, it will after an interval of time, cause armature 1034 to drop to its back position.

A circuit is now completed from ground through wiper of switch 1001, over armature 1027 and its front contact, the back contact and armature 1034, armature 1038 and its back contact, the wiper of the switch 1000, its third contact, armature 1039 and its back contact, winding of relay 1013, and battery to ground.

The energization of the relay 1013, which is a group selecting relay, makes a group selection over its contact and locks itself up over a circuit from ground through battery, winding of relay 1013, first contact of the bank controlled by the relay 1013, to ground over armature 1036.

An energizing circuit is also completed for the relay 1045 over the second contact of the bank controlled by relay 1013. The energization of relay 1045 opens all the circuits for the remaining group selecting relays over its armature contacts. The impulses now continues to be received, causing the wipers of the switches to be stepped from contact to contact, but since no pause occurs, the relays 1008 and 1009 remain energized during the short periods while their circuits are opened. At the end of the second pause period, however, the relay 1009 is again deenergized, since the wiper is on the fifteenth contact and the pause is sufficiently long to deenergize the relay.

An energizing circuit is now again completed from ground through wiper of switch 1001, armature 1027 and its front contact, the back contact and armature 1034, armature 1038 and its back contact, the wiper of switch 1000, its fifteenth contact, the winding of relay 1017, and battery to ground. The relay 1017 is energized to make final selection, locks itself over its first contact and completes an energizing circuit for the relay 1011, from ground through battery, winding of relay 1011, second contact of the bank controlled by relay 1017, to ground. Relay 1011 locks itself up over its armature and armature 1035, and opens all the selecting circuits at armature 1038, thereby preventing any further selection from being performed. The wipers now continue to step to the twenty-fifth contact, at which point the third pause or checking impulse occurs.

At the twenty-fifth impulse, if the two sets of switches at the office and substation, are in synchronism, they will reach the twenty-fifth contact simultaneously, and a pause or long pulse will occur, which is produced when the relay 986 is maintained energized while the wiggle tail armature of relay 914 operates between its contacts enabling the relay 1006, the circuit of which is now opened at switch wiper 1003 to be deenergized. Upon the deenergization of this relay, an operating circuit is completed from ground, through the wiper of switch 1003, its twenty-fifth contact, the back contact and armature 1030, the contact of the bank controlled by relay 1013, the contact controlled by the relay 1017, conductor 1050, the contact 522 of the selector switch 506, the contact 595 of switching relay 518, armature 531 and its front contact, winding of relay 503 and battery to ground.

Should the switches not operate in synchronism, the pause occurring at the twenty-fifth impulse under ordinary synchronous conditions will not occur when the switch wipers at the substation reach their twenty-fifth contact. As a result, neither the relay 1008 or 1009 will deenergize and no operating circuit can then be completed. The dispatcher will observe, by the failure of the supervisory signal to indicate a change, that no operation has occurred and will repeat the operation of the code sender.

The energization of the relay 503 closes an energizing circuit for the operating relay 504 at armature 526, and the circuit breaker is operated to its closed position. The movement of the circuit breaker, from its open to its closed position, opens the energizing circuits for the relays 501 and 500.

After an interval of time, these relays are deenergized to cause the armatures to drop to their back position and a supervisory impulse is transmitted back over the line from ground through battery, back contact and armature 532, the contact 596 of the switching relay 518, contact 523, supervisory line 22, contact 382 of the selector relay 314 at the office, contact 388 of the switching relay 315, armature 332 and its back contact and winding of relay 303 to ground.

The energization of the relay 303 operates its armature to unlatch the armatures 328 to 330. An energizing circuit is completed for the relay 304 over armature 329, which functions to transfer the supervisory line from the relay 303 to the relay 302. The circuit for the indicating lamp 327, which indicates an opened circuit breaker, is opened at armature 328 and an energizing circuit is completed for the lamp 326, indicating the closed position of the circuit breaker.

An energizing circuit is completed for the relay 300 from ground through battery, winding of the relay 300, armature 333 and its front contact, the lower contact of the key member 392 to ground. The operating circuit for the circuit breaker is thus opened, thereby preventing any further operation of the circuit breaker. Upon receipt of the supervisory indication just mentioned, the drive line is again closed to continue through the remaining selectors until restored to normal. This is accomplished by reason of the movement of the latching relays to a position in agreement with the keys so that the circuit for the relays 406 or 416 is again completed to permit further operation of the driving circuits.

If the circuit breaker should operate automatically instead of under the control of the dispatcher, the energizing circuits for the relays 500 and 501 are opened in the manner already described. Since, however, relay 501 releases much more quickly than the slow-release relay 500, its armature 533 will drop to its back position, while the armature 530 is still on its front contact, and a circuit will be completed from ground, through armature 533 and its back contact, armature 530 and its front contact, the conductor 560, winding of relay 811 and battery to ground. The relay 811 is thus energized and locked over its armature 848.

The energization of relay 811, completes an energizing circuit for the relay 818, from ground through armature 849 and its front contact, armature 851 and its back contact, armature 850 and its back contact, armature 863 and its front contact, armature 859 and its back contact, winding of relay 818, and battery to ground.

The energization of relay 818 completes a series locking circuit for itself and winding 817 at armature 861, which is not effective at this time. However, after an interval of time, the relay 500 is deenergized, its armature drops to its back position and the energizing circuit for the relay 811 is opened. Since the locking circuit for the relay 811 is opened at armature 861 as a result of the energization of the relay 818, this relay will now be deenergized and the original energizing circuit for the relay 818 will be opened at armature 849.

Armature 817 now energizes to open the normal drive circuit at armature 860. The driving operations are now performed in a manner already described in connection with the control operation, until the switching relay controlling the apparatus unit, which was automatically operated, and the selecting relay associated therewith, is energized to connect it to the supervisory line, when a supervisory impulse will be transmitted over the line in manner already described.

In the event that an automatic operation takes place while the apparatus is in operation, the holding relay 813 will be deenergized as described in detail above. One result of the deenergization of relay 813 is to complete an energizing circuit for relay 812 over the armature 852 and its back contact.

It will be assumed, for purposes of illustration, that the circuit breaker C is automatically operated to its closed position while the selecting apparatus is off of the normal position and in operation. As has been described in detail above, a momentary impulse is thereupon impressed on conductor 560 from ground, over armature 533 and its back contact, front contact and armature 530, conductor 560, the coil of relay 811, to ground. Relay 811 energizes and locks over armatures 848 and 861 and the armature of relay 820 to ground. A further result of the energization of relay 811 is to complete an energizing circuit for the relay 815 over armature 849 and its front contact, armature 851 and its front contact, the armature and back contact of relay 814 and, through the winding of relay 815, to battery and ground.

Relay 815, upon energization, completes a locking circuit for itself and relay 814 over its armature and that of relay 816. This circuit, however, is not effective at this time because of the direct ground for relay 815.

No further operations occur at this time until the selectors at the office and station are restored to their normal non-operating condition. As described above, when the apparatus is restored to normal, the relay 813 is again energized over the normal holding circuit and, as a result, the energizing circuit for relay 812 is opened, and armature 851 drops to its back contact, opening the original energizing circuit.

Upon the energization of relay 814, an energizing circuit is completed for relay 818 over the armature of relay 814, armature 850 and its back contact and armature 863 and its front contact, armature 859 and its back contact to the winding of the relay 818 and battery to ground. Energization of relay 818 completes an energizing circuit for relay 816. As a result of the energization of relay 816, the locking circuit for relays 814 and 815 is opened and these relays are deenergized. As a result of the deenergization of relay 814, the original energizing circuit for relay 818 is opened and the relays 817 and 818 are energized in series. Thereafter the operations are identical with those described above.

It is obvious, from the preceding description, that the chances for a false selection are considerably minimized by my invention, and furthermore, that the amount of apparatus required for a large number of selections has been considerably reduced.

Although I have shown my invention as applied to supervisory control, it is obvious that it has other applications in the signalling art, and I do not intend to limit myself by the specific illustration herein, except as set forth in the appending claims.

I claim as my invention:

1. In a signalling system, the combination with a plurality of stations, of groups of apparatus units at each station, selecting relays at each station for associating predetermined apparatus units at one station with corresponding apparatus units at another station in sequence, a group of counting relays individual to said selecting relays at each station for operating said selecting relays in synchronism, and switching mechanism at each station operated in synchronism for switching said counting and selecting relays from one group of units to another.

2. In a signalling system, the combination with a plurality of stations, of apparatus units at each station, selecting relays at each station for associating predetermined apparatus units at one station with corresponding apparatus units at another station in sequence, a group of counting relays individual to said selecting relays at each station for operating said selecting relays in synchronism, and switching mechanism individual to each group of units at each station and operated in synchronism, said switching mechanism being connected between said units and selecting relays.

3. In a signalling system, a first station, a second station, apparatus units at said second station, synchronously operated means at said first and said second station for selecting one of said apparatus units from said first station for placing the said unit in condition for operation, means for transmitting a code combination of impulses individual to the selected unit from said first to said second station, means at said second station responsive to said code combination of impulses for effecting the operation of said selected unit and means whereby the operation of said unit is not effected if the code combination of impulses received is not that individual to the selected unit.

4. In a supervisory control system, a first station, a second station, a plurality of groups of apparatus units at said second station, a single group of selecting relays at said second station having the same number of relays as there are units in a group, a signalling line connecting said stations, a plurality of groups of switch-over relays electrically interconnected between said selecting relays and said apparatus units, each of said switch-over relays being individual to one of said groups of apparatus units and connected electrically thereto and to said selecting relays, means for energizing one of said switch-over relays, means for energizing said selecting relays successively, said signalling line being connected to contacts on said selecting relays whereby said signalling is extended through said selecting relays and said switch-over relays successively to said apparatus units in groups individual to said switch-over relay as said selective relays are successively energized, means operative following the complete energization of all of said selecting relays for deenergizing said switch-over relay, means for energizing a succeeding switch-over relay, said selecting relays energizing through a second cycle of operations for successively associating said signalling line through said selecting relays and switch-over relays, to other apparatus units individual to said other switch-over relays.

5. In combination, a control station, a remote station, a plurality of devices at the remote station to be controlled from the control station, said devices being arranged in groups, a series of selecting relays at the remote station equal in number to the number of devices in one of the groups, means for operating said relays in sequence through a plurality of cycles, a line connecting said stations, means whereby said relays in the first cycle connect sequentially devices in the first group with the line, switching means whereby the relays in the succeeding cycles of operation successively connect devices in the succeeding groups with the line, and means for operating said devices from said first station over said line as said devices are connected to said line.

6. In combination, a control station, a remote station, a plurality of devices at the remote station to be controlled from the control station, said devices being arranged in groups, a series of selecting relays at the remote station equal in number to the number of devices in one of the groups, means for operating said relays in sequence through a plurality of cycles, a line connecting said stations, means whereby said relays in the first cycle of operation sequentially connect the devices in the first group with the line, switching means whereby the relays in the succeeding cycles of operation successively connect devices in the succeeding groups with the line, operating means at said control station individual to each of said devices, said operating means being arranged in groups, a series of selecting relays at said control station equal in number to the number of operating means in one of the groups, means for operating said control station relays in sequence through a plurality of cycles, means whereby said control station relays in the first cycle of operation sequentially connect the operating means in the first group with the line, switching means whereby the control station relays in the succeeding cycles of operation successively connect the operating means in the succeeding group with the line, and means for operating the remote station relay operating means and the first switching means, respectively, in synchronism with the control station relay operating means and the second switching means.

7. In combination, a control station, a remote station, a plurality of devices at the remote station to be controlled from the control station arranged in groups, a series of selecting relays at the remote station equal in number to the number of devices in one of the groups, means for operating said relays in sequence through a plurality of cycles, a line connecting said stations, means whereby said relays in the first cycle sequentially connect units in the first group with the line, and switching means interposed between said selecting relays and said devices whereby the relays in the succeeding cycles of operation successively connect devices in the succeeding groups with the line and means at said first station for controlling said devices over the line as they are connected thereto.

8. In combination, a control station, a remote station, a plurality of devices at the remote station to be controlled from the control station, said devices being arranged in groups, a series of selecting relays at the remote station equal in number to the number of devices in one of the groups, a series of counting relays at the remote station, one for each of said selecting relays, means for operating said counting relays sequentially through a plurality of cycles, means controlled by the sequential operation of said counting relays for operating said selecting relays sequentially through a plurality of cycles, a line connecting said stations, means whereby said selecting relays in their first cycle of operation connect the devices in the first group sequentially with the line, switching means whereby the selecting relays in the succeeding cycles of operation successively connect the devices in the succeeding groups with the line, a plurality of operating means at the control station individual to each of said devices, said operating means being arranged in groups, a series of selecting relays at the control station equal in number to the number of operating means in one of the groups, a plurality of counting relays at the control station one for each of said selecting relays, means for operating said counting relays at the control station sequentially through a plurality of cycles in synchronism with the counting relays at the remote station, means controlled by the sequential operation of said control station counting relays for operating said control station selecting relays sequentially through a plurality of cycles, means whereby the selecting relays at the control station in their first cycle of operation connect the operating means in the first group with the line, switching means whereby the remote station selecting relays in the succeeding cycles of operation successively connect the operating means in the succeeding groups with the line, and means for operating the switching means at the remote station in synchronism with the switching means at the control station.

In testimony whereof, I have hereunto subscribed my name this 27th day of May, 1926.

THOMAS U. WHITE.